United States Patent [19]

Pflüger et al.

[11] 4,406,961

[45] Sep. 27, 1983

[54] SLIP RING ASSEMBLY

[75] Inventors: Gerhard Pflüger, Markgröningen; Burkhardt Schmidt; Martin Scholpp, both of Stuttgart; Reinhold Wamsler; Manfred Frister, both of Schwieberdingen, all of Fed. Rep. of Germany

[73] Assignee: Robert Bosch GmbH, Stuttgart, Fed. Rep. of Germany

[21] Appl. No.: 380,341

[22] Filed: May 20, 1982

[30] Foreign Application Priority Data

May 27, 1981 [DE] Fed. Rep. of Germany ....... 3121105

[51] Int. Cl.³ .................................................. H01R 39/08
[52] U.S. Cl. ................................................... 310/232
[58] Field of Search .......................... 310/68, 165, 232

[56] References Cited

U.S. PATENT DOCUMENTS

| 3,042,998 | 7/1962 | Sweett et al. | 310/232 |
| 3,686,514 | 8/1972 | Dube et al. | 310/232 |
| 3,688,142 | 8/1972 | Förste et al. | 310/232 |
| 4,105,907 | 8/1978 | Hagenlocher et al. | 310/232 |

FOREIGN PATENT DOCUMENTS 831646 3/1960 United Kingdom ................ 310/232

Primary Examiner—Donovan F. Duggan
Assistant Examiner—Anita M. Ault
Attorney, Agent, or Firm—Frishauf, Holtz, Goodman & Woodward

[57] ABSTRACT

Insulation between a rotor shaft and slip rings for electrical connection to a rotary winding is provided by a layer coating the shaft that is sintered in place from fluidized bed material, providing a thin layer that is sufficiently tough for slip rings to be mounted on top so that the layer provides the insulation from the shaft. The slip rings may be quite thin, thus keeping the active surface of the slip ring to a very small diameter. Brass and bronze slip rings may be press-fitted onto the shaft while maintaining the insulation of the layer, but carbon slip rings, which are desirable for long life are best secured by means of an adhesive. The slip ring assembly is particularly useful for three-phase alternators of motor vehicles.

8 Claims, 3 Drawing Figures

SLIP RING ASSEMBLY

This invention concerns a slip ring assembly on the shaft of an electrical machine such as the alternator of a motor vehicle, which carries an exciter winding on it that must be energized through slip rings, and particularly for a slip ring assembly providing slip rings of small outer diameter so as to make space available for substantial brush length within the casing of a small unit.

A slip ring assembly providing slip rings of small diameter is disclosed in DE-OS No. 25 39 091.4, which originated from the assignee of the present application. In the structure there disclosed the slip rings are first mounted on a connecting bushing. The bushing is then slid onto the generator shaft. The intermediate bushing itself is an electrical insulator and serves also as the carrier of the slip rings. This approach to the problem of providing slip rings of small diameter is of somewhat limited applicability, mainly on account of the manufacturing costs.

THE INVENTION

It is an object of the present invention to provide a more economical manner of providing slip rings of small diameter on the shaft of an electrical machine which is especially suited for mass production.

Briefly, the step of premounting the slip rings on a bushing is completely dispensed with. The shaft is coated at the end where it is to carry the slip rings with a fluidized bed material that is centered in place thereon to provide a tough but quite thin insulating layer. The bushings are then slid into place over the insulating layer and preferably bonded by adhesive. In a preferred form of the invention the adhesive in question is the same resin that is used to impregnate the exciter winding that is mounted on the shaft.

The invention has the advantage that an electrical machine rotor or commercially normal configuration can be utilized and that manufacturing and assembly proceeds in a simple fashion. Notable economy is possible by the adoption of the invention. Compared with known devices having small slip ring diameters the slip ring assembly of the invention makes possible a longer service life for the slip rings and for the rotor.

In a preferred form of the invention longitudinal grooves are provided in the rotor in the neighborhood of the slip ring location and the electrical connection between winding and slip ring are guided in such grooves for a further saving of space, enabling economy to be achieved by keeping the slip ring diameter small.

In a further special development, sintered carbon slip rings are utilized for increasing the service life of both the slip rings and the carbon brushes usually used. With the assembly of the invention it is possible to replace the carbon slip rings without difficulty after they wear down or when a defect shows up.

By the affixing of carbon slip rings by means of an adhesive, the sensitive carbon rings themselves need not take up any tension as the result of internal pressure. With the elimination of the insulating bushings, furthermore, the outer diameter of the slip rings can be kept only slightly larger than the outer diameter of the machine shaft on which they are supported. The space thus saved in the machine can be utilized to permit the use of longer carbon brushes, providing a still further extension of service life of the equipment.

When the slip rings are made of solid metal, for example of copper or bronze, they can of course be pressed onto the rotor shaft as was commonly done, before the present invention, in affixing slip rings with intermediate insulating bushings.

THE DRAWINGS

The invention is further described by way of illustrative example with reference to the annexed drawings in which.

DESCRIPTION OF THE ILLUSTRATED EMBODIMENTS

Figure 1:
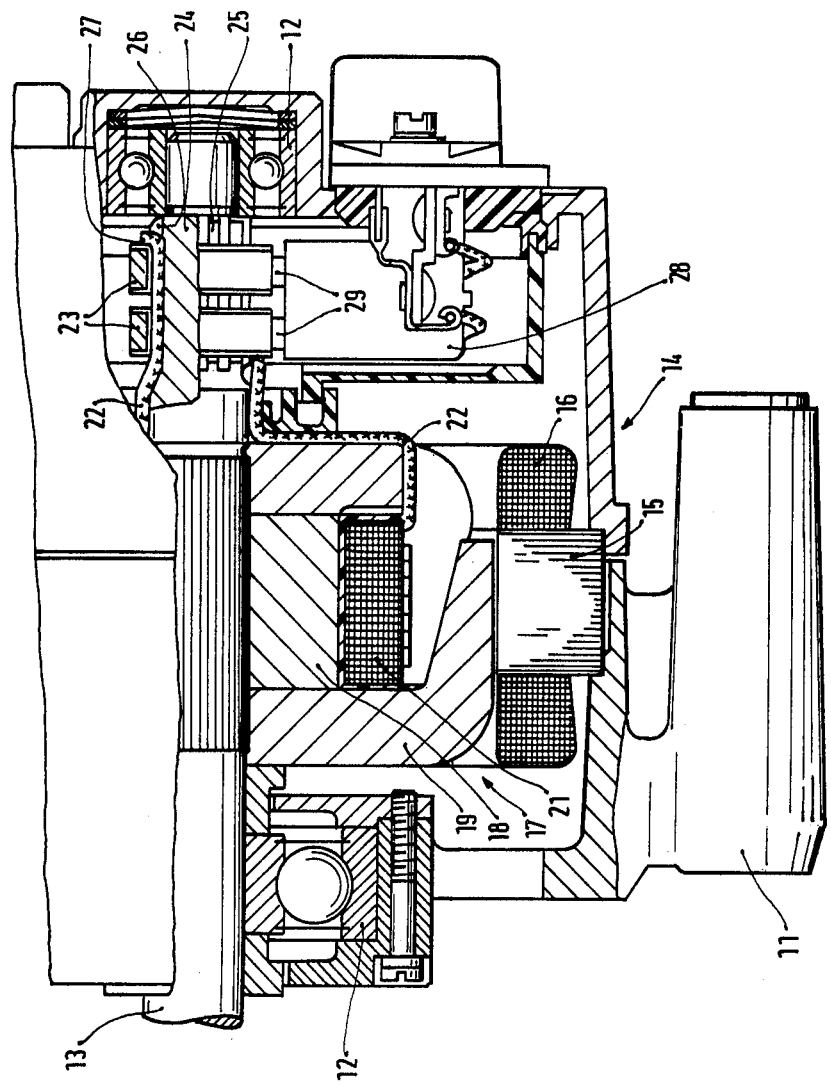
FIG. 1 is a side view, mostly in section, of a three-phase alternator equipped with metal slip rings.

FIG. 1 shows the shaft 13 of a three-phase alternator mounted in bearings 12 of a casing 11, in which is also located a stator composed of a stator core 15 and a phase winding 16. A rotor 17 is mounted on the machine shaft 13 and is composed of a core 18, pole wheels 19 and an exciter winding 21. The latter is connected by its winding ends 22 to slip rings 23.

The end of the shaft 13 by which the alternator is driven is at the left in FIG. 1 and is not shown. At its other end 24 the shaft 13 has longitudinal corrugations 25. The lengthwise corrugations are convenient, but not necessary. Only a single groove 26 is essential and in it one end 22 of the exciter winding 21 is guided so that it can be soldered or welded onto the more remote slip ring 23.

In the embodiment illustrated in FIG. 1 the slip rings 23 are relatively massive and made of solid bronze or copper. In the illustrated case they are affixed onto the machine shaft by transverse compression to provide a press-fit. They could, however, be secured by an adhesive on the rotor shaft 13. In such a case the impregnating of resin with which the exciter winding 21 is saturated or filled is used as the glue for the slip rings. In thus affixing the slip rings by adhesive on the shaft 13, the rings must be put in place before the impregnating lacquer or resin has hardened.

The slip rings are insulated from the shaft by an insulating layer 27 that in the illustrated case is formed from a fluidized bed layer. As the material for such a layer a product sold under the trademark RESICOAT® is particularly suitable.

Carbon brushes 29 are guided in a brush holder unit 28. The brush holder is of such a configuration that relatively long brushes 29 can be provided there. The length of the brushes 29 is increased by the same measure that the diameter of the slip rings is reduced by omitting the use of an insulating bushing.

Figure 2A:
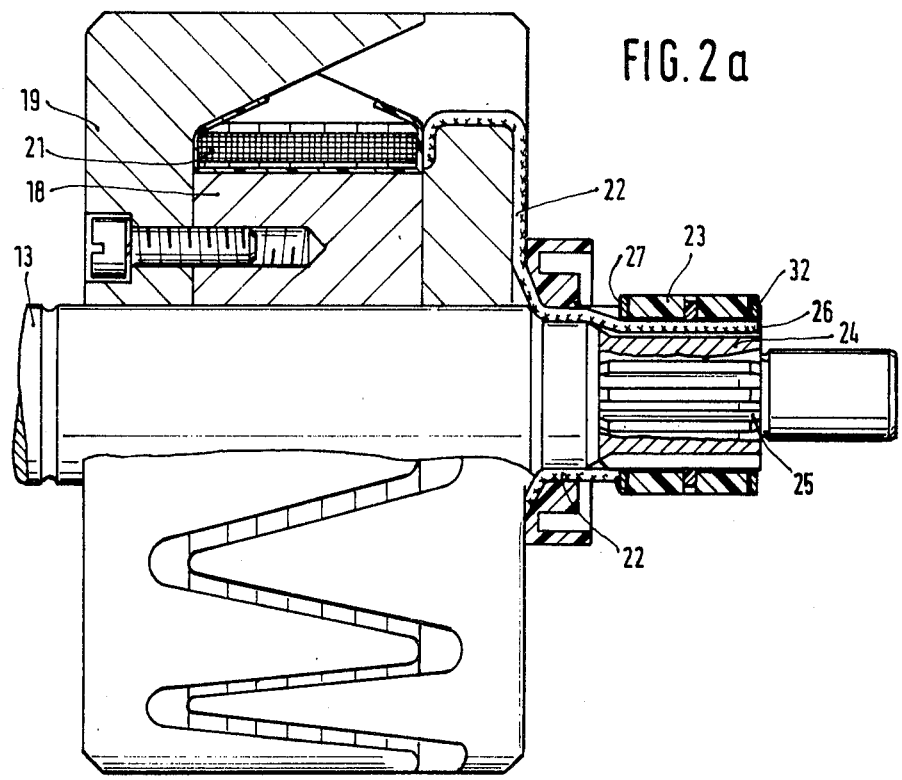
FIG. 2a is a side view, partly in section, of a rotor for an alternator equipped with carbon slip rings.
Figure 2B:
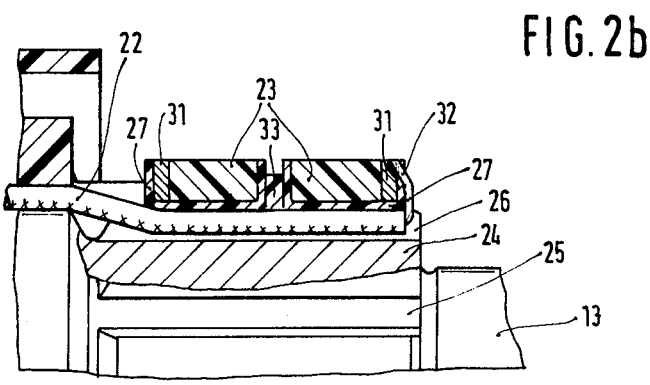
FIG. 2b is a detail, partly in section, of a portion of FIG. 2a on a larger scale.

In the embodiment shown in FIG. 2 the slip rings 23 are made of sintered carbon. Here also the slip rings 23 are insulated from the shaft 13 by an insulating layer 27 sintered into place with fluidized bed material. The slip rings are bonded onto the shaft 13 or onto the lengthwise corrugation 25 of the shaft 13 with the help of the impregnating resin that is also used for impregnating the exciter winding 21. The impregnating resin can, if desired, be applied only on the end surfaces of the longitudinal corrugations 25 or else it can be applied there and also allowed to fill the grooves between the ridges of the corrugations 25. In this example also a complete longitudinal corrugation is not necessary and it is quite sufficient to provide a single lengthwise groove 26. The carbon slip rings 23 are provided at least at one end with a solderable layer 31, for example a copper layer. The conductor 32 of the winding end 22 is soldered or welded onto this layer 31. The slip rings are insulated from each other and spaced apart by a spacer ring 33.

Although the invention has been described with reference to particular illustrative embodiments, it will be recognized that variations and modifications are possible within the inventive concept.

I claim:

1. Slip ring assembly on the rotor shaft (13) of an electrical machine having a rotary exciter winding (21), comprising:

an insulating layer (27) firmly bonded on said shaft consisting of fluidized bed material sintered in place thereon, and two slip rings (23) firmly seated by a pressed-on fit on said insulating layer and each connected by an electrical conductor to one end (22) of said winding (21), said shaft having an alternation of longitudinal grooves (27) and ridges (25) in the portion thereof where said slip rings are seated, said electrical conductor (32) connecting to one of said slip rings (23) being brought from said winding end to said one of said slip rings by way of one of said grooves (27), and said grooves in said shaft, except in so far as a conductor is guided in a said groove, being filled with an impregnating resin by which said slip rings are secured to said insulating layer of said shaft.

2. Slip ring assembly as defined in claim 1 in which said impregnating resin is a resin with which said winding (21) is also impregnated.

3. Slip ring assembly as defined in claim 2 in which the end of said shaft which bears said slip ring (23) is coated with said impregnating resin.

4. Slip ring assembly as defined in claim 1, in which said slip rings are made of sintered carbon.

5. Slip ring assembly as defined in claim 4 in which each said slip ring (23) is provided with a solderable layer (31) sintered on at least one of the side surfaces of said slip ring (23).

6. Slip ring assembly as defined in claim 5 in which said electrical conductor (32) is electrically connected with a said solderable layer (31).

7. Slip ring assembly as defined in claim 1, in which said slip ring (23) is made of solid metal.

8. Slip ring assembly as defined in claim 1, in which a spacer (33) is provided between said slip rings which also furnishes mutual insulation.

* * * * *